United States Patent Office 3,564,608
Patented Feb. 16, 1971

1

3,564,608
SELECTED N-ACYLSUBSTITUTED-N'-HYDROXYGUANIDINES
Hermann Breuer, Regensburg, Germany, assignor to Olin Corporation, a corporation of Virginia
No Drawing. Continuation-in-part of application Ser. No. 566,480, July 20, 1966. This application Oct. 9, 1967, Ser. No. 673,975
Claims priority, application Germany, July 30, 1965, C 36,548
Int. Cl. C07c *103/30*
U.S. Cl. 260—559                                    5 Claims

ABSTRACT OF THE DISCLOSURE

Selected N - acylsubstituted - N - hydroxyguanidines are provided by the reaction of selected acyl carbodiimides with hydroxylamine or salts thereof. The substituted guanidines are useful agricultural chemicals particularly as herbicides.

---

This application is a continuation-in-part of my copending application Ser. No. 566,480, filed July 20, 1966, now abandoned.

This invention relates to the preparation of selected N - acylsubstituted - N' - hydroxyguanidines having the following general formula:

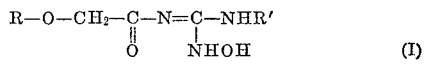

(I)

wherein R represents a halogenated aryl moiety; and R' represents hydrogen or alkyl; and to the mineral acid addition salts of the compounds I.

Certain N - substituted - N' - hydroxyguanidines have been previously prepared. However, the preparation of compounds of this nature having a halogenated aryloxyacetyl group attached to the hydroxyguanidine moiety has not been heretofore accomplished. Now, in accordance with this invention, the compounds I have been provided, and it has been found that they are characterized by biological properties making them useful agricultural chemicals, particularly as herbicides.

The preparation of the substituted guanidines I is accomplished in accordance with this invention by reacting selected acyl carbodiimides with hydroxylamine or one of its salts as, for instance, shown in the following equation wherein R and R' are as previously represented.

$$R-O-CH_2-C(=O)-N=C=NR' + H_2NOH \longrightarrow (I)$$

The acyl carbodiimide reactants wherein R' represents alkyl are readily available by treating acyl thioureas with phosgene in the presence of tertiary amines as, for instance, reported in Archiv. der Pharmazie, Band 299, August 1966, page 709; and preferred embodiments of this invention include the use of reactants of this nature wherein R' represents a lower alkyl (e.g., 1–4 carbon atoms) group.

It is known that the acyl carbodiimide reactants wherein R' represents hydrogen exist in a tautomeric relationship with acyl cyanamides. In this regard attention is directed, for instance, to Houben-Weyl's treatise entitled "Methoden Der Organischen Chemie," Vierte Auflage, 1952, Band VIII, page 94 for a discussion of such tautomerism. Thus, for instance, halogenated aryloxyacetyl cyanamides of the formula

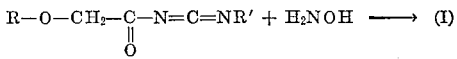

(II)

2 exist as tautomers of the acyl carbodiimides having the formula

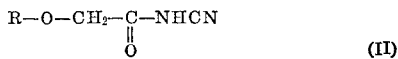

(III)

In accordance with this known tautomeric relationship, it has been found that halogenated aryloxyacetyl cyanamides of the Formula II are useful as reactants in the practice of this invention. They apparently react with hydroxylamine or a salt thereof in the form of the tautomeric acyl carbodiimides III to provide the compounds I of this invention wherein R' represents hydrogen. As used therefore in the specification herein, it is understood that the term "acyl carbodiimide" used in defining suitable reactants includes halogenated aryloxyacetyl cyanamides of the Formula II.

The compounds II are readily provided by the reaction of cyanamide or a salt thereof with halogenated aryloxyacetyl chlorides preferably in the presence of suitable bases which facilitate the reaction by acting as acid acceptors and increasing desirable solubility characteristics. The preparation of halogenated aryloxyacetyl cyanamides of this type has been described in detail in my copending U.S. patent application, Serial No. 674,008, entitled "Halogenated Aryloxyacetyl Cyanamides," filed concurrently herewith; and the complete disclosure of that U.S. patent application is specifically incorporated by reference herein.

Particularly useful halogenated aryloxyacetyl cyanamides II (acyl carbodiimides) to be used in the practice of this invention are those wherein R represents a halogenated aryl group having from 6–10 carbon atoms and not containing any unsaturation other than of the benzenoid type. Thus, R may represent a phenyl, tolyl, xylyl, naphthyl or like group substituted with one or more halogen atoms directly attached to said aryl ring. Illustrative of such starting materials are o-chlorophenoxyacetylcyanamide,
o-bromophenoxyacetylcyanamide,
o-fluorophenoxyacetylcyanamide,
o-iodophenoxyacetylcyanamide,
p-chlorophenoxyacetylcyanamide,
p-bromophenoxyacetylcyanamide,
p-fluorophenoxyacetylcyanamide,
p-iodophenoxyacetylcyanamide,
2,4-dichlorophenoxyacetylcyanamide,
2,4-dibromophenoxyacetylcyanamide,
2,4-difluorophenoxyacetylcyanamide,
2,4-diiodophenoxyacetylcyanamide,
3,4-dichlorophenoxyacetylcyanamide,
3,4-dibromophenoxyacetylcyanamide,
3,4-difluorophenoxyacetylcyanamide,
3,4-diiodophenoxyacetylcyanamide,
2,4,5-trichlorophenoxyacetylcyanamide,
2,4,5-tribromophenoxyacetylcyanamide,
2,4,5-trifluorophenoxyacetylcyanamide,
2,4,5-triiodophenoxyacetylcyanamide,
2-methyl-4-chlorophenoxyacetylcyanamide,
2-methyl-4-bromophenoxyacetylcyanamide,
2-methyl-4-fluorophenoxyacetylcyanamide,
and 2-methyl-4-iodophenoxyacetylcyanamide.

Other suitable halogenated aryloxyacetyl cyanamides II (acyl carbodiimides) which may be used as starting materials in the preparation of the compounds I are disclosed in my aforementioned copending U.S. patent application Ser. No. 674,008. While the aryl moieties included in R may be substituted by one or more of any of the halogens (e.g., fluorine, chlorine, bromine, iodine), preferred embodiments of this invention include those compounds I where R represents chlorinated aryl and especially chlorinated phenyl.

The process for the preparation of the N-acylsubstituted-N'-hydroxyguanidines of this invention comprises reacting acyl carbodiimides (including the aforementioned substituted cyanamides II) with hydroxylamine or salts thereof at a selected temperature range of about −10° C. to 30° C. Hydroxylamine hydrochloride is a particularly useful reactant, although other mineral acid salts of hydroxylamine (e.g., sulfate) may also be employed in the process. When such salts of hydroxylamine are employed as reactants, the substituted guanidine products may be conveniently isolated as a salt as, for instance, illustrated in Example 1 hereinafter.

The presence of small amounts of organic bases appears to promote formation of the compounds I, and in this regard it has been found that various heterocyclic bases such as pyridine and quinoline in amounts of at least 0.2 mole/mole of carbodiimide reactant are usefully employed. Excess base however does appear to cause degradation of the products I, and it is particularly important to maintain the reaction temperature below about 30° C. while such bases are in contact with the N-acylsubstituted-N'-hydroxyguanidines I.

Various solvents are advantageously employed in the process. For instance, the lower alkanols such as methanol, ethanol and the like are suitably utilized as well as other solvents such as dioxane. The desired products I and the mineral acid salts thereof are usually conveniently isolated by crystallization procedures from the reaction mixtures.

The following example serves to illustrate the preparation of the N-acylsubstituted-N'-hydroxyguanidines of this invention and salts thereof. However, it is understood that this example is not to be considered as limiting the scope of this invention in any manner and is furnished merely for the purpose of illustration.

EXAMPLE 1

7.7 g. of hydroxylamine hydrochloride was dissolved in a solution of 50 mls. of ethanol and 4.0 g. of pyridine at a temperature of about 40° C. The resulting solution was cooled to about 20° C., and 21.1 g. (0.10 mole) of p-chlorophenylacetyl cyanamide was added to the solution. The reaction temperature rose to 30° C. within 30 minutes, and external cooling means were provided for additional 60 minutes to maintain temperature thereafter at about 30° C. A clear solution was obtained, from which a solid began to precipitate soon after. The reaction mixture was stirred for two hours longer, and then the solid precipitate was filtered, washed with cold ethanol and air dried. 12.4 g. (44.3% yield) of a white crystalline product, M.P. 170°–171° C. (decomposition), was thus obtained. The following analytical data revealed that N-p-chlorophenoxyacetyl-N'-hydroxyguanidine hydrochloride had been obtained.

Analysis.—Calcd. for $C_9H_{11}Cl_2N_3O_3$ (percent): C, 38.60; H, 3.96; Cl, 25.38; N, 15.00. Found (percent): C, 38.54; H, 4.25; Cl, 25.39; N, 1476.

The hydrochloride is converted to N-p-chlorophenoxyacetyl-N'-hydroxyguanidine by suspending it in water and treating the suspension with sodium hydrogen carbonate. The free base melts at 110° C. with decomposition.

The N-acylsubstituted-N'-hydroxyguanidines and mineral acid addition salts thereof are characterized by high activity as herbicides. They are useful aquatic herbicides as shown by evaluation against mixed algae and duckweed. They are useful broad spectrum herbicides against a variety of grassy and broad-leaf weeds, and in addition they are minimally phytotoxic against at least one cash crop (corn) which makes them useful as selective herbicides.

The value of the compounds I and their mineral acid addition salts (e.g., hydrochloride, sulfate, nitrate, etc.) as herbicides has been clearly demonstrated. For instance, a primary screening evaluation revealed that the substituted hydroxyguanidines and salts thereof at a dosage level of 10 lbs./acre were highly effective in inhibiting the growth of a mixture of weeds including ryegrass, crabgrass, pigweed and mustard representing common species of unwanted plants of both grassy and broad-leaf type. These test results were obtained when the active ingredients were employed in both pre- and post-emergence treatment.

More advanced testing has confirmed the excellent herbicidal properties exhibited by the compounds disclosed and claimed herein, and in addition this further testing has revealed the selective nature of the phytotoxicity possessed by these compounds. For instance, greenhouse flats were planted with seeds of different plants including weed and crop species for evaluation of the phytotoxic effects of the compounds I and salts thereof, and the following procedure was utilized in this evaluation. First the soil in the flats was seeded with crop seeds, and these seeds were covered with a layer of soil. Next weed seeds were planted on designated parts of the soil, and these seeds were covered with another layer of soil. The flats were then sprayed with acetone-water solutions of selected herbicidal candidates prior to placing the flats in growing rooms maintained at constant conditions of temperature, humidity and lighting to encourage optimum plant growing. After a period of 2½ weeks, the flats were examined in order to determine the effects of the active ingredients on the varied weed and crop species which had been planted.

In the following table wherein the results of this test are tabulated, the plant and weed species are represented by the following letters:

A—crabgrass
B—pigweed
C—mustard
D—Johnson grass
E—barnyard grass
F—foxtail
G—corn The relative value of each compound with respect to its herbicidal effect on the various plants is indicated by a number as follows:

0 _____ No phytotoxicity.
1–4 _____ Slight phytotoxicity.
5–7 _____ Moderate phytotoxicity.
8–10 _____ Severe phytotoxicity.

TABLE I

| | Lbs. per acre | A | B | C | D | E | F | G |
|---|---|---|---|---|---|---|---|---|
| N-p-chlorophenoxyacetyl-N'-hydroxyguanidine | 10 | 10 | 10 | 9 | 10 | 9 | 10 | 1 |
| | 5 | 10 | 10 | 9 | 10 | 7 | 10 | 1 |
| | 1 | 7 | 10 | 9 | 9 | 0 | 5 | 0 |
| N-p-chlorophenoxyacetyl-N'-hydroxyguanidine, hydrochloride | 10 | 9 | 10 | 9 | 9 | 9 | 8 | 3 |
| | 5 | 9 | 10 | 9 | 8 | 6 | 5 | 0 |
| | 1 | 5 | 10 | 6 | 8 | 0 | 5 | 0 |

The data in the above table verifies the high activity of the substituted hydroxyguanidines and mineral acid salts thereof as preemergence herbicides against a variety of weed species and the low phytotoxicity of these herbicidal agents with respect to corn crops.

The agricultural method of this invention thus comprises applying a phytotoxic amount of the active herbicidal ingredients to the locus to be protected from undesirable weed growth; for example, it is applied directly to weeds in post-emergence treatment and to soil areas in preemergence treatment.

Although the herbicides may be directly administered to the area where control of weed growth is desired, they are preferably admixed with carriers and diluents which are commonly referred to as pest control adjuvants. Thus a wide variety of such adjuvants may be utilized with the herbicides of this invention to provide herbicidal formulations conveniently adapted for application using conventional applicator equipment. In this respect, both solid and liquid herbicidal formulations containing a member of the series I or mineral acid salts thereof as the essential active ingredient are provided in accordance with this invention.

For example, dust compositions are readily provided by mixing the active herbicidal agents with various free-flowing solid carriers and grinding the resulting mixture to obtain a dust having an average particle size of about 20-50 microns. Among the solid carriers which may be employed in such formulations are natural clays such as attapulgite and kaolinite clays, diatomaceous earth, finely divided talcs and synthetic mineral fillers derived from silica and silicate such as synthetic fine silica and synthetic calcium and magnesium silicates. Other suitable carriers include magnesium and calcium carbonates. Concentration by weight of the active ingredient in these dusts is generally in the range of about 5-20%, although larger concentrations may be utilized if desired.

The herbicides may be advantageously formulated with other carriers to provide wettable powders. These powders are conveniently prepared by mixing the active ingredient with solid carriers of the aforementioned type and adding to the mixture a surface-active agent in amount sufficient to impart water dispersibility to the powdered compositions. Aqueous dispersions of such wettable powders are particularly adapted for spraying and sprinkling operations on areas which are to be protected from weed growth.

Numerous surface-active agents are available and suitable for use in such wettable powders. These agents may be referred to as wetting or dispersing agents, and they may be of the nonionic, cationic or anionic type. Mixtures of such agents are conveniently employed in these formulations in a manner well known to those skilled in this art. For example, among those surface-active agents commonly employed in these compositions are alkyl aryl sulfonates such as sodium decyl benzene sulfonate, fatty alcohol sulfates such as sodium dodecyl sulfate, alkali metal oleates, sodium lignosulfonate and the like. A comprehensive listing of many other surface-active agents suitable for use in the formulation of typical agricultural dispersions, suspensions, etc., has been prepared and disclosed by McCutcheon in "Soap and Chemical Specialties," 31, Nos. 7-40 (1955).

Wettable powders of the above type usually contain about 0.1-10.0% by weight of the aforementioned surface-active agents with the preferred concentration naturally being dependent upon the nature of the system in which the agent is used and the particular type of application technique being employed. Wettable powders containing about 2-5% of these surface-active agents are generally prepared.

Other solid herbicidal compositions containing the compounds I and salts thereof as active ingredients are provided in accordance with this invention by dissolving the chemical in a volatile solvent (i.e., acetone) and impregnating this solution upon granular solids such as attapulgite clay, ground vegetable shells, walnut shells, and the like. Upon removal of the solvent, potent solid herbicidal formulations are obtained. A typical granular formulation of this type contains 10-20% by weight of the herbicidal ingredient.

Similarly, suspension-type formulations may be conveniently prepared having the herbicidal agents of this invention as the active ingredients. For instance, organic solutions of N-p-chlorophenoxyacetyl-N' - hydroxyguanidine containing one of the aforementioned dispersing agents can be added to water to provide suspensions suitable for spraying operations. The mineral acid addition salts of the substituted hydroxyguanidines I are quite soluble in water (especially the hydrochlorides), and these aqueous solutions are particularly useful for spraying techniques.

Naturally, in order to control the undesirable weed growth, the active ingredient must be applied to the area or locus to be protected in an amount sufficient to exert the desired herbicidal action. Thus, it may be necessary to apply different amounts of the compounds I and salts thereof to achieve a desired result depending upon the the extent and nature of weed growth, application procedures and other varying features. Generally, it has been found that the growth of grassy and broad-leaf weed species can be effectively inhibited by applying the active ingredients of htis invention at a rate of about 1-10 pounds per acre.

What is claimed is:
1. A substituted hydroxyguanidine of the formula

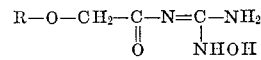

wherein R is chlorinated phenyl.

2. The compound of claim 1 having the name N-p-chlorophenoxyacetyl-N'-hydroxyguanidine.

3. A mineral acid addition salt of a compound of claim 1.

4. A hydrochloride addition salt of a compound of claim 1.

5. The compound of claim 4 having the name N-p-chlorophenoxyacetyl-N' - hydroxyguanidine, hydrochloride.

References Cited

UNITED STATES PATENTS 3,481,980  12/1969  Teitel et al. _____ 260—559

HENRY R. JILES, Primary Examiner

H. I. MOATZ, Assistant Examiner

U.S. Cl. X.R.

71—118